United States Patent [19]

Supelak et al.

[11] 4,435,487
[45] Mar. 6, 1984

[54] PRIMARY BATTERY SYSTEM

[75] Inventors: Lawrence S. Supelak, Rocky River; Steven J. Specht, Mentor; Richard C. Hills, Chardon, all of Ohio

[73] Assignee: Gould Inc., Rolling Meadows, Ill.

[21] Appl. No.: 449,485

[22] Filed: Dec. 13, 1982

[51] Int. Cl.³ .............................................. H01M 6/34
[52] U.S. Cl. ........................................ 429/70; 429/72; 429/120
[58] Field of Search ....................... 429/70, 72, 49, 14, 429/6, 25, 34, 47, 120

[56] References Cited

U.S. PATENT DOCUMENTS

| | | | |
|---|---|---|---|
| 3,160,525 | 12/1964 | Hutchison et al. | 429/6 |
| 3,589,940 | 6/1971 | Bridge et al. | 429/6 |
| 3,953,239 | 4/1976 | Anderson | 429/120 |
| 4,308,322 | 12/1981 | Hammar | 429/81 X |

Primary Examiner—Anthony Skapars
Attorney, Agent, or Firm—Wood, Dalton, Phillips, Mason & Rowe

[57] ABSTRACT

A battery system (10,110) wherein an electrolyte solution of lithium hydroxide dissolved in seawater is circulated through a battery cartridge (11,111). The system is placed under pressure. A portion of the electrolyte mixture is discharged from the system through a suitable pressure regulating valve (20) while concurrently, fresh seawater is delivered into the system as by a pressurizing pump (17). The increased pressure acts to increase the density of the gaseous portion of the ejected gas liquid mixture, reduce the volume of the gaseous portion of the ejected gas-liquid mixture, thereby reducing the total volume of the ejected mixture, and reduce the ratio of gas volume to liquid volume in the system as well as the ejected gas-liquid mixture.

16 Claims, 2 Drawing Figures

PRIMARY BATTERY SYSTEM

DESCRIPTION

1. Technical Field

This invention relates to metal-water electrochemical cells and in particular to means for controlling the electrolyte composition in such cells.

2. Background Art

One well-known form of metal-water electrochemical cell comprises a lithium/silver oxide cell. The electrolyte in such a cell comprises a solution of lithium hydroxide in water. In one marine application of such a cell, the lithium hydroxide is dissolved in seawater.

The power developed by the cell is a function of several variables, such as temperature, electrolyte velocity, electrode area, electrode spacer configuration, voltage, gas-liquid volume ratio, and lithium hydroxide concentration in the electrolyte. Thus, by suitably controlling the amount of dissolved lithium hydroxide to desired varying values, while controlling the remaining variables to nearly constant values, variable power output may be obtained.

In the operation of such a cell, lithium hydroxide is generated as a by-product of the electrochemistry, thus changing the concentration of lithium hydroxide in the electrolyte. To control the concentration of lithium hydroxide in the circulated electrolyte, a portion of the electrolyte circulated from the cell having an increased lithium hydroxide concentration is discharged and replaced with water, which, in the marine application discussed above, is seawater.

The control of the lithium hydroxide in such an application is complicated by the fact that another by-product of the electrochemistry of the cell is hydrogen gas. The hydrogen does not dissolve in the electrolyte to any great extent but forms a distributed mixture therein, tending to pressurize the system.

It has been conventional in such systems to separate the hydrogen gas from the electrolyte prior to ejection of a portion of the electrolyte having the increased concentration of lithium hydroxide. Such hydrogen gas separation subsystems are relatively expensive, bulky, and require undesirable energy consumption in the operation of the battery system.

DISCLOSURE OF INVENTION

The present invention comprehends an improved battery system which eliminates the need for separation of the gaseous by-product produced in the electrolyte as a result of the electrochemistry of the cell by controlling the pressurization of the system as a function of the rate of discharge of the electrolyte suitable for maintaining the desired lithium hydroxide concentration for the desired power output.

In the illustrated embodiment, the system is caused to have a sufficient hydrogen gas pressure so as to provide a desired small gas-to-electrolyte volume ratio, permitting the use of a circulation pump of conventional design. The invention comprehends that the maintained hydrogen gas pressure is less than a preselected pressure so as to avoid the need for bulky and heavy structures in containing the pressurized hydrogen gas. It has been found that the provision of means to effect the desired pressurizing of the system permits the gas-to-electrolyte volume ratio in the system reservoir to rise at a decreasing rate so that during the normal operation of the battery system, the gas-to-electrolyte volume ratio in the reservoir becomes effectively constant at a pressure less than a preselected maximum.

The invention comprehends providing pressure regulating means for discharging the electrolyte from the reservoir as an incident of the pressure thereof exceeding the preselected operating pressure.

The invention further comprehends the provision of pressure control means permitting the pressure condition of the electrolyte to cause an increase in the density of the gaseous component in the electrolyte, resulting in a reduced ratio of the gaseous component volume to the liquid component volume of the gas-electrolyte mixture.

The invention broadly comprehends the provision in a battery system including a battery cartridge producing a gaseous by-product and a solute by-product in a circulated electrolyte liquid as an incident of electrochemical operation thereof, of pressurizing means for placing the electrolyte mixture under a preselected pressure, and replacing a portion of the pressurized electrolyte mixture with water. The pressure is preselected to cause the ratio of the volume of gaseous by-product to volume of the liquid component to be reduced, thereby reducing the volume of the portion of the mixture being discharged, and, upon replacement of the ejected mixture with water, permitting the electrolyte mixture provided to the battery cartridge to have a desired solute concentration and gas-to-liquid volume ratio, for desired operation of the battery.

Thus, broadly under a specific steady operation condition, the mass flow rate of the ejected gas and the mass flow rate of the ejected electrolyte remain substantially steady since the electro-chemical reaction is substantially steady. The effects of the increased system pressure as to increase the density of the gaseous portion of the ejected gas-liquid mixture, reduce the volume of the gaseous portion of the ejected gas-liquid mixture, thereby reducing the total volume of the ejected mixture, and reduce the ratio of gas volume to liquid volume in the system as well as the ejected gas-liquid mixture.

The battery electrolyte control system of the present invention is extremely simple and economical of construction while yet providing improved efficiency, size and weight reduction, and reliability.

BRIEF DESCRIPTION OF THE DRAWING

Other features and advantages of the invention will be apparent from the following description taken in connection with the accompanying drawing wherein.

BEST MODE FOR CARRYING OUT THE INVENTION

Figure 1:
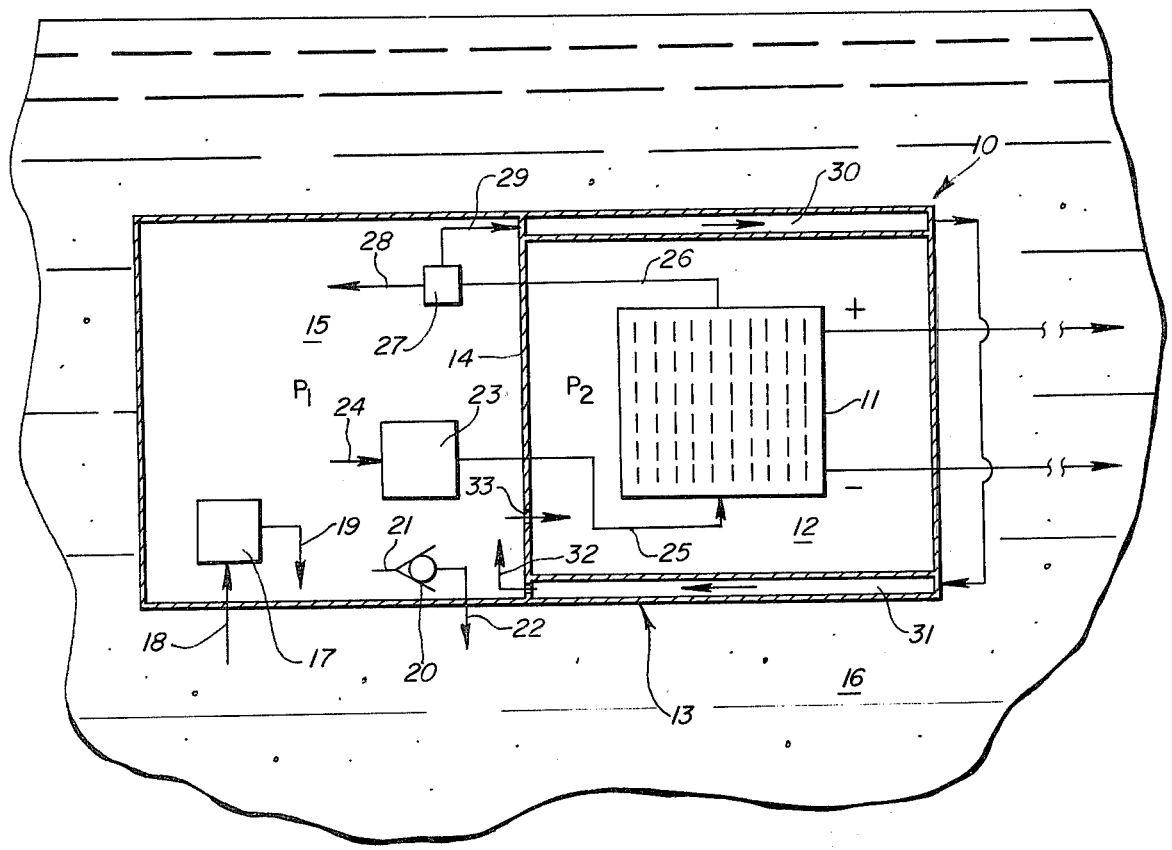
FIG. 1 is a schematic illustration of a battery system embodying the invention.

In the illustrative embodiment of the invention as disclosed in the drawing, a battery system generally designated 10 is shown to comprise a primary battery system having a battery cartridge 11 disposed in a battery cartridge zone 12 within a housing 13. The housing is provided with a divider wall 14 separating zone 12 from a reservoir chamber 15.

In the illustrated embodiment, battery cartridge 11 comprises a lithium/silver oxide battery cartridge utilizing an electrolyte comprising an aqueous solution of lithium hydroxide. In the illustrative system, water is introduced into the electrolyte from the surrounding ambient seawater 16.

Water is drawn into reservoir 15 by means of a pump 17 having an inlet 18 opening to the ambient seawater, and an outlet 19 opening to the reservoir 15. The invention comprehends the pressurizing of the electrolyte in the reservoir and, in the illustrative embodiment, a pump 17 is provided for producing pressure in the reservoir chamber 15 greater than the ambient pressure.

The pressure in chamber 15 is desirably maintained at the preselected elevated pressure, such as approximately 25 psi absolute to 3500 psi absolute, and preferably in the range of approximately 100 psi absolute to 1000 psi absolute, by a suitable pressure regulating valve 20. As shown, the valve is connected through an inlet 21 to the reservoir chamber 15 and through an outlet 22 to exteriorly of the housing 13.

As will be obvious to those skilled in the art, the valve 20 inlet could also be connected to other locations within the electrolyte circulation path, such as to battery cartridge discharge 26, thermostatic bypass valve discharge 29, heat exchanger paths 30 through 31, heat exchanger discharge 32, or circulation pump discharge 25.

Circulation of electrolyte from reservoir 15 through the battery cartridge 11 and back to the reservoir 15 is effected by means of a main pump 23 having an inlet 24 opening to the reservoir chamber 15. An outlet 25 of the pump 23 is connected to one side of the battery cartridge 11 for delivering the electrolyte through the battery to outlet 26 thereof extending through the divider wall 14 to thermostat bypass valve 27. In the illustrated embodiment, the thermostat valve is located in reservoir 15, as seen in FIG. 1, it being obvious to those skilled in the art that the thermostat valve can be provided at other suitable locations in the electrolyte circulation path.

The thermostat valve is selectively operable to deliver the returned electrolyte through a first outlet 28 directly to the reservoir chamber 15, or through second outlet 29 to a heat exchanger 30 providing heat exchange between the electrolyte circulated therethrough and the ambient seawater 16 through the housing 13. As will be obvious to those skilled in the art, the heat exchange may be provided at any desired location in the electrolyte circulation path.

As further shown in FIG. 1, the heat exchanging means includes a second portion 31 also providing heat exchange between the electrolyte flowed therethrough and the ambient seawater 16 through the housing 13, with the outlet 32 of the heat exchanger portion 31 opening into the reservoir chamber 15.

In the battery system 10 illustrated in FIG. 1, divider wall 14 is provided with suitable openings 33 providing communication between reservoir chamber 15 and zone 12 exteriorly of the battery cartridge 11 so as to place both the reservoir and zone 12 at substantially equal pressure.

Figure 2:
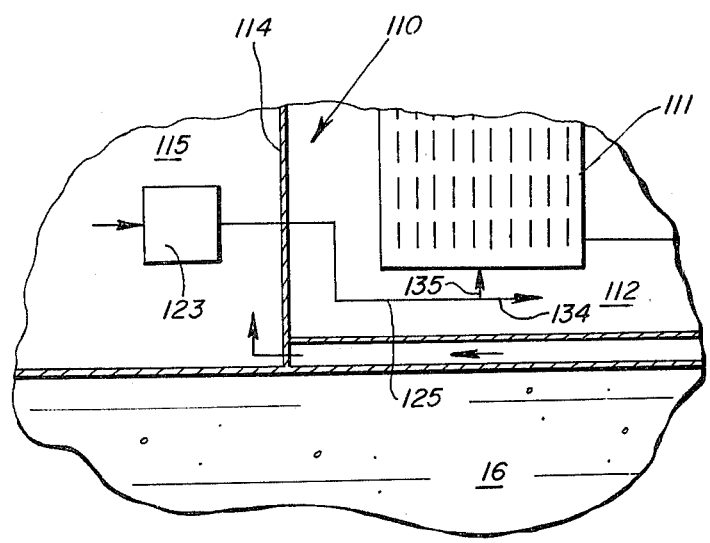
FIG. 2 is a fragmentary schematic illustration of a modification of a portion of the system of FIG. 1 embodying the invention.

In a modified form of the invention, as illustrated in FIG. 2, a battery system generally designated 110 is similar to battery system 10, but is provided with a dividing wall 114 which is imperforate so as to effectively maintain the pressure in reservoir chamber 115 selectively different from the pressure in zone 112 surrounding the battery cartridge 111. The discharge conduit 125 from the main pump 123 includes a first outlet 134 opening to zone 112 and a second outlet 135 opening to the battery cartridge 111. Thus, zone 112 and the inlet to the battery cartridge are placed under equal pressures. In all other respects, battery system 110 is similar to and functions similar to battery system 10.

INDUSTRIAL APPLICABILITY

In one embodiment of the invention, the battery cartridge 11 comprised a lithium/silver oxide battery cartridge. Pump 17 comprised a positive displacement pump with a variable output capacity of approximately 0 gpm to 60 gpm, operating at approximately 2 gpm to 20 gpm when the battery is required to deliver full power, suitable to place the reservoir chamber at a pressure of approximately 100 psi absolute to 1000 psi absolute, and more specifically, in the illustrated embodiment, at a pressure of approximately 200 psi absolute to 800 psi absolute. The main pump 23 provided a discharge of approximate 50 gpm to 500 gpm at full power, at a pressure differential of approximately 20 psi to 350 psi for providing the desired circulation of the electrolyte fluid.

By maintaining the pressure in reservoir 15 at approximately 200 psi absolute, or greater, the hydrogen gas by-product by operation of the battery cartridge 11 was compressed in the electrolyte liquid so as to have a ratio to the lithium hydroxide by-product produced by operation of the battery cartridge suitable to permit the mixture of the elecyrolyte and compressed hydrogen gas to be discharged through valve 20 while maintaining the molarity or the lithium hydroxide in the electrolyte in reservoir 15 suitable to provide desired operation of the battery cartridge 11 when recirculated thereto by pump 23.

It has been found that where the battery system is operated at a depth in the seawater of approximately 200' to 3,000' or more, sufficient pressure is produced by the ambient seawater to effect the desired compression of the hydrogen gas in reservoir 15. However, when the battery system is operated at lesser depths, the pump 17 and regulating valve 20 maintain a minimum pressure within the reservoir 15 sufficient to permit ejection of sufficient quantities of hydrogen gas, while maintaining a desired low gas-to-liquid volume ratio in the circulated fluid mixture, so as to permit continuing operation of the battery system as a primary battery system, with a portion of the recirculated electrolyte being continuously discharged by replacement with fresh seawater electrolyte through the inlet pump 17.

Resultingly, the expensive and energy inefficient separation of hydrogen gas from the returned electrolyte is effectively eliminated by the improved simplified structure of the present invention providing improved efficiency and reliability in the operation of the primary battery system.

The heat generated by operation of the battery cartridge is transmitted to the ambient seawater through the heat exchanger 30, 31, when necessary, under the control of thermostat valve 27. Where the temperature of the returned electrolyte mixture is below the setting of the thermostat valve, the mixture may be delivered directly back to the reservoir 15 through the outlet conduit 28 without the need for heat exchange.

Where it is desired to maintain the pressure within the zone surrounding the battery cartridge substantially equal to the pressure at the battery cartridge inlet, the system 110 illustrated in FIG. 2 may be employed.

To initiate operation of the battery, a measured amount of lithium hydroxide is dissolved in seawater with the solution then being introduced into the battery cartridge inlet. In one illustration embodiment, the starting solute was dry sodium hydroxide stored in the reservoir area. As will be obvious to those skilled in the art, other suitable start-up means may be utilized within the scope of the invention.

In summary, the invention comprehends a novel battery system wherein the gaseous by-product generated by the battery cartridge in the electrochemical operation thereof is maintained in the fluid mixture at a preselected pressure so as to reduce the ratio of the volume of the gaseous component to the volume of the liquid component within the fluid mixture. Maintenance of the desired concentration of the solute is effected by introducing fresh solvent to replace a portion of the pressurized fluid which is discharged, thereby removing from the system a portion of the generated gaseous by-product and reducing the solute concentration to the desired level. The invention is advantageously adapted for use in a lithium/silver oxide battery system.

The invention comprehends any modification of the disclosed system wherein pressurizing all or any part of the system, permitting the gas and electrolyte liquid to be ejected as a mixture, is desired. Thus, the invention is adapted for use wherein the recirculating electrolyte normally constitutes a gas/liquid mixture.

The foregoing disclosure of specific embodiments is illustrative of the broad inventive concepts comprehended by the invention.

We claim:

1. A primary battery system comprising:
   a closed housing to be submerged in a liquid solvent and defining a reservoir and a battery cartridge zone;
   a battery cartridge in said battery cartridge zone comprising an electrochemical cell utilizing the solvent and a solute as an electrolyte and a generating gas and additional solute by-product as a result of electrochemical operation thereof;
   means for providing additional solvent from exteriorly of the housing to within said housing at an elevated pressure;
   means for circulating fluid including the electrolyte with generated solute, generated gas, and additional solvent from the reservoir, through said cartridge, and back to said reservoir; and
   pressure regulated means for discharging excess fluid mixture from said reservoir as an incident of the pressure thereof exceeding a preselected operating pressure, the elevated pressure condition of the fluid mixture causing a reduction in the gas to liquid volume ratio.

2. The battery system of claim 1 wherein said battery cartridge comprises a lithium/silver oxide battery cartridge.

3. The battery system of claim 1 wherein said circulating means includes heat transfer means for cooling at least a portion of the fluid delivered from said cell.

4. The battery system of claim 1 wherein said circulating means includes heat transfer means in heat exchange relationship to the ambient liquid solvent through said housing for cooling at least a portion of the fluid.

5. The battery system of claim 1 further including means for maintaining said battery cartridge zone at the same pressure as that in said reservoir.

6. The battery system of claim 1 further including means for maintaining said battery cartridge zone at the same pressure as that at the inlet to said battery cartridge.

7. The battery system of claim 1 wherein said means for providing ambient liquid solvent to said housing comprises a high pressure pump.

8. The battery system of claim 1 wherein said means for providing ambient liquid solvent to said housing comprises a high pressure positive displacement pump.

9. The battery system of claim 1 wherein said battery cartridge comprises a lithium/aqueous battery cartridge.

10. A primary battery system comprising:
    a primary battery cartridge producing as an incident of electrochemical operation thereof a gaseous by-product and a solute by-product in a circulated electrolyte liquid;
    means for replacing a portion of the fluid with fresh electrolyte solvent;
    pressurizing means for placing the fluid including the electrolyte, the replacement solvent and said by-products therein under a pressure preselected to cause the volume ratio of the gaseous component to liquid component of the mixture to be reduced; and
    recirculating the fluid to the battery cartridge for further operation thereof.

11. The primary battery system of claim 10 wherein said battery cartridge defines a lithium silver oxide cell and the electrolyte comprises a solute of seawater and lithium hydroxide.

12. The primary battery system of claim 10 wherein said means are provided for selectively causing operation of said pressurizing means when the ambient pressure is less than a preselected pressure.

13. The primary battery system of claim 10 wherein means are provided for selectively causing operation of said pressurizing means when the ambient pressure is less than approximately 1000 psi absolute.

14. A lithium/silver oxide battery system comprising:
    a lithium/silver oxide battery cartridge producing as an incident of electrochemical operation thereof a gaseous hydrogen by-product and a lithium hydroxide by-product in a seawater electrolyte solvent;
    means for placing the fluid mixture having said by-products therein under a preselected pressure;
    discharging a portion of the produced hydrogen gas and a portion of the liquid electrolyte, as a mixture; and
    recirculating the pressurized fluid mixture to the battery cartridge, said pressure being preselected to cause the volume ratio of the gaseous hydrogen to liquid electrolyte on the mixture to be reduced to a preselected ratio.

15. The lithium/silver oxide battery system of claim 14 including means for replacing the discharged portion of the fluid with solvent seawater.

16. The primary battery system of claim 14 further including means for cooling the fluid during operation of the system.

* * * * *